(12) United States Patent
Namburu et al.

(10) Patent No.: US 8,930,305 B2
(45) Date of Patent: Jan. 6, 2015

(54) ADAPTIVE INFORMATION PROCESSING SYSTEMS, METHODS, AND MEDIA FOR UPDATING PRODUCT DOCUMENTATION AND KNOWLEDGE BASE

(75) Inventors: Setu Madhavi Namburu, St. Louis, MO (US); Danil Prokhorov, Ann Arbor, MI (US); Liu Qiao, Ann Arbor, MI (US); Sandesh Ghimire, Ann Arbor, MI (US)

(73) Assignee: Toyota Motor Engineering & Manfuacturing North America, Inc., Erlanger, KY (US)

( * ) Notice: Subject to any disclaimer, the term of this patent is extended or adjusted under 35 U.S.C. 154(b) by 295 days.

(21) Appl. No.: 12/619,392

(22) Filed: Nov. 16, 2009

(65) Prior Publication Data

US 2011/0119231 A1    May 19, 2011

(51) Int. Cl.
*G06F 17/00* (2006.01)
*G06F 17/30* (2006.01)
*G06Q 10/06* (2012.01)

(52) U.S. Cl.
CPC ........................................... *G06Q 10/06* (2013.01)
USPC .......................................... 707/609; 707/709

(58) Field of Classification Search
USPC ................................................. 707/609, 709
See application file for complete search history.

(56) References Cited

U.S. PATENT DOCUMENTS

| | | | |
|---|---|---|---|
| 6,609,051 B2 | 8/2003 | Feichter et al. | |
| 6,654,770 B2 | 11/2003 | Kaufman | |
| 2002/0016655 A1* | 2/2002 | Joao | 701/35 |
| 2005/0065678 A1* | 3/2005 | Smith et al. | 701/29 |
| 2005/0248444 A1* | 11/2005 | Joao | 340/426.13 |
| 2006/0112109 A1 | 5/2006 | Chowdhary et al. | |
| 2006/0195492 A1 | 8/2006 | Clark et al. | |
| 2006/0200258 A1* | 9/2006 | Hoffberg et al. | 700/86 |
| 2007/0022410 A1 | 1/2007 | Ban et al. | |
| 2007/0088776 A1 | 4/2007 | Whear et al. | |
| 2007/0271269 A1 | 11/2007 | Chen et al. | |
| 2008/0015748 A1* | 1/2008 | Nagy | 701/33 |
| 2008/0119980 A1* | 5/2008 | Ross et al. | 701/33 |

* cited by examiner

*Primary Examiner* — Hosain Alam
*Assistant Examiner* — Navneet K Ahluwalia
(74) *Attorney, Agent, or Firm* — Christopher G. Darrow; Young Basile Hanlon & MacFarlane P.C.

(57) ABSTRACT

An adaptive information processing system for updating product documentation and associated knowledge base is disclosed, the system including at least one subsystem for receiving original data from a data source, and a central dynamic data system to integrate the original data from the at least one subsystem. The central dynamic data system is configured to integrate system knowledge with the original data to form integrated data, wherein the central dynamic data system is configured to dynamically update the product documentation and the knowledge base based on the integrated data. A computer implemented method for dynamically updating product documentation and knowledge base is further disclosed, the method includes receiving original data from a data source, and integrating the knowledge base with the original data from the data source to form integrated data. The method further includes mapping the integrated data with at least one application and dynamically updating product documentation and the knowledge base based on the integrated data.

21 Claims, 6 Drawing Sheets

ADAPTIVE INFORMATION PROCESSING SYSTEMS, METHODS, AND MEDIA FOR UPDATING PRODUCT DOCUMENTATION AND KNOWLEDGE BASE

TECHNICAL FIELD

The present disclosure relates generally to the field of information technology, and more specifically, to methods, systems, and media for integrating information related to automotive parts and services.

BACKGROUND

As the value and use of information continues to increase, individuals and businesses seek additional ways to process and manage information. Particularly, with tremendous growth in business information, in the magnitude of terabytes, for example, businesses seek adaptive and event-driven information technology to process (e.g., integrate, manage, analyze) the widely distributed data sources for domain dependent applications.

With current information technology, product documentation or data related to goods and services, such as repair documentation or technical documentation, may be static and/or domain dependent with long procedures and transcription errors. Oftentimes, current product documentation may not get updated until the next version of documentation is released. Also, current information technology may not present the most proper or efficient connection among subsystems or processes which derive or process the data to become incorporated into product documentation. In an industry such as automotive services, for example, subsystems or processes such as warranty, logistics, field service, and technical documentation, may not be properly connected to knowledge/data sources such as domain semantics, technical knowledge, natural text verbatim, web data, sensor data, and parts data. Alternatively, the aforementioned subsystems/processes may not be properly connected to objectives such as quality improvement, cost reduction, early issue identification, or the like.

Thus, a need exists for an improved knowledge-driven adaptive service systems, methods, and media to process data among domain dependent applications to improve the methodology for the creation and/or updating of product documentation and knowledge base activities. Such systems, methods, and media may efficiently provide information processing among various segments of an automotive service chain such as product documentation, field service, warranty analysis, and logistics to properly align them with their respective data resources and objectives.

SUMMARY

The following presents a general summary of several aspects of the disclosure in order to provide a basic understanding of at least some aspects of the disclosure. This summary is not an extensive overview of the disclosure nor is it intended to identify key elements of the disclosure or to delineate the scope of the claims. The following summary merely presents some concepts of the disclosure in a general form as a prelude to the more detailed description that follows.

One aspect of the present disclosure provides an adaptive information processing system for updating product documentation and associated knowledge base, the system including at least one subsystem for receiving original data from a data source, and a central dynamic data system to integrate data from the data source. The central dynamic data system is configured to integrate the knowledge base with the original data to form integrated data, and wherein the central dynamic data system is further configured to dynamically update the product documentation and the associated knowledge base based on the integrated data.

Another aspect of the present disclosure provides a computer implemented method for dynamically updating product documentation and knowledge base, the method including receiving original data from a data source, and integrating the knowledge base with the original data from the data source to form integrated data. The method further includes mapping the integrated data with at least one application and dynamically updating product documentation and the knowledge base based on the integrated data.

Another aspect of the present disclosure provides a computer implemented method for dynamically updating automotive repair documentation, the method including receiving original data from a data source, and integrating the original data with the knowledge base to dynamically update the automotive repair documentation.

Another aspect of the present disclosure provides for a computer-readable medium having instructions stored thereon that when executed causes a computer to execute a method for dynamically updating product documentation and knowledge base. The method includes receiving original data from a data source and integrating the knowledge base with the original data from the data source to form integrated data. The method further includes mapping the integrated data with at least one application and dynamically updating the product documentation and the knowledge base based on the integrated data.

Yet another aspect of the present disclosure provides for a computer-readable medium having instructions stored thereon that when executed causes a computer to execute a method for dynamically updating automotive repair documentation and knowledge base, the method including receiving original data from a data source, and integrating the original data with the knowledge base to dynamically update the automotive repair documentation.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present methods, systems, and computer-readable storage media are described, it is to be understood that this disclosure is not limited to the particular methods, systems, and media described, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

One of ordinary skill in the art should understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a system" refers to one or several systems and reference to "a method of integrating" includes reference to equivalent steps and methods known to those skilled in the art, and so forth.

Figure 1:
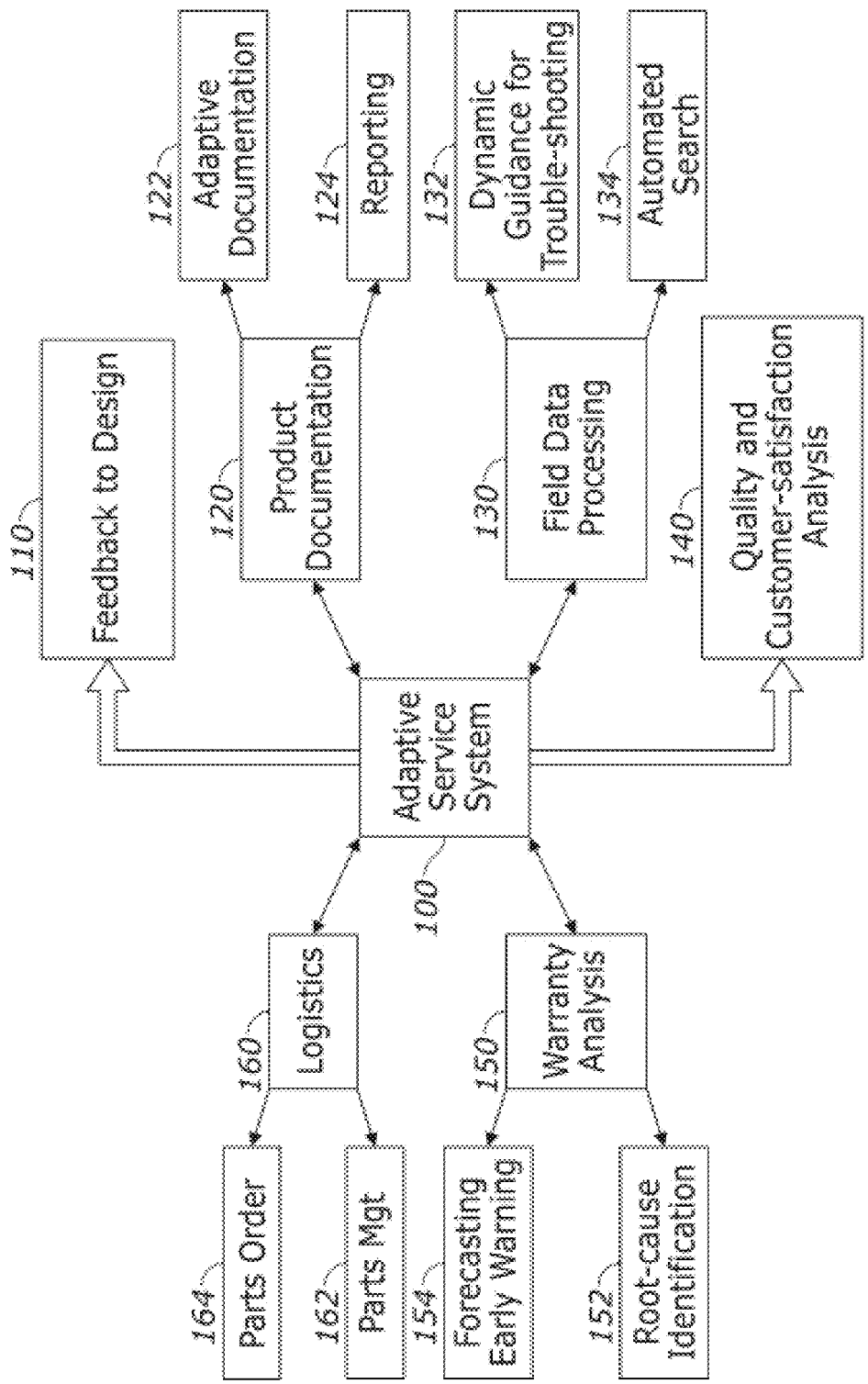
FIG. 1 illustrates an adaptive service system in accordance with one aspect of the present disclosure.

Turning now to FIG. 1, a schematic is provided of an adaptive service system, indicated generally at 100, as one implementation of an information processing system. Although the present disclosure describes the adaptive service system 100 in relation to automotive services (e.g., repair services), it should be understood that methods, systems, and media of the present disclosure may have applicability to any adaptive service system which dynamically receives and processes data from multiple subsystems or data sources. Further, references made herein to products or services may correlate specifically to vehicles or repair services, respectively. The dynamic nature of the adaptive service system 100 may allow the system to adapt and integrate original data based on changes in incoming data over time. As shown, the adaptive service system 100 may comprise various building blocks of service, also referred to herein as subsystems to receive original data from data sources, including product documentation 120, field data processing 130, warranty analysis 150, and logistics 160.

Product documentation 120 may include repair and/or product manuals, for example. In the event when an automotive or vehicular product is developed, even prior to sale to a customer, product or repair manuals may be created. The manuals may be dynamically updated, through adaptive documentation 122 (i.e., updating of documentation), from original data received from an internal department (e.g., engineering, design, development, manufacturing, sales, service) within an automotive company utilizing a meta data (e.g., an extensible markup language (XML)) database to store and model a repair procedure. As used herein, "adaptive" may refer to any methodology not requiring human or manual input/intervention but rather driven by the receipt of some type of data. Product documentation 120 may be created using semantic relationships (discussed in detail below) whereby common concepts are shared by various types of documentation (e.g., repair manuals, user manuals, product manuals, technician courses). Multi-media mining may be a technique employed to identify common and sharable concepts to create the semantic relationships. Repair procedures, hierarchical domain structures, and information reflecting domain terminology may be maintained in the system knowledge (discussed below) of the adaptive service system 110. The product documentation is thus automatically (i.e., adaptively) compiled based on a given application and/or product (e.g., vehicle) using the system knowledge, thus reducing redundant documentation.

Product documentation 120 may be characterized by adaptive documentation 122, via changes in vehicle design or through knowledge acquired by the adaptive service system 100. Automated reporting 124 may further be generated reflecting the changes for providing feedback to design 110 or to the adaptive service system 100.

Another example of a data source may include field data 130, whereby original data in the form of field cases (e.g., repair cases) are received and analyzed using case based reasoning and/or learning algorithms. Generally, field data processing 130 may utilize original data from various sources, such as an XML database or from a semantic network (to be described below) or original data collected from the internet, in the form of unstructured data, for example. As an example, an automated search 134, used to retrieve knowledge from documentation or previous repair cases, may help dealer technicians search for relevant repair procedures and provide suggestions linking the knowledge to a given repair procedure.

Field data processing 130 may further comprise dynamic guidance for trouble-shooting 132 whereby questions are asked and dynamic guidance is provided through trouble-shooting trees. The trouble-shooting trees are adapted to the skill level of technicians, based on his/her search criteria or answers to the questions asked, for example, and repair procedures (e.g., steps, graphics) are provided accordingly. The repair case base is dynamically updated and product documentation 120 may be updated with the knowledge extracted, such as through the identification of repair procedures by mining past repair cases or blogs.

Field cases utilized for field data processing 130 are tracked in real-time to identify emerging or critical issues. Incoming repair cases, normally acquired through sources such as dealers, remote-services or the Internet, for example, may be processed for analysis. During such processing step, natural language text processing techniques may be used to standardize the natural language text received and extract concepts. Extracted concepts may include, but are not limited to, named entities from condition, cause, remedy, repair text observed symptom, part name, action taken by technician, or failure type.

As an example of field data processing 130, a network of dealers may compile information regarding vehicle models which experience brake failure. The information compiled may comprise the method in which each technician diagnoses the part failure, thus making up the knowledge base, i.e., knowledge acquired by the adaptive service system 100, for field data processing. Knowledge base may be used interchangeably with system knowledge in the present disclosure to refer generally to knowledge acquired and integrated by the adaptive service system 100. In the present example, after accumulating information regarding a single or multiple instances of brake failure, should a future brake failure occur, a technician may refer to a past case to determine the method(s) for repairing brakes. Thus, repair documentation and knowledge base related to brakes may be adaptively updated following the accumulation of field data pertaining to brake failure.

As part of the adaptive service system 100, a central dynamic data system (not shown), including a processor or the like, may integrate original data with the knowledge base, thus forming integrated data. Product documentation 120 and knowledge base, may in turn, may be dynamically updated by the central dynamic data system based on the integrated data.

With regard to warranty analysis 150, field cases or original data received during a warranty period for a vehicle may be analyzed to predict claims or identify root-causes. Further, through warranty analysis 150, early warning regarding future problems and/or the forecasting of potential problems may occur. Unstructured data may be converted to structured data or data in standard format, thus allowing features to be extracted from indexed/ranked cases for analysis. Exemplary features may include vehicle mileage, duration (e.g., months) in service, region, temperature, driver type, fault condition observed, action take by a technician, or the like. Further, multi-dimensional analysis is performed on the features to achieve multiple objectives of the warranty system. Based on information previously compiled internally within the company from customer feedback, such as through field data processing 130, predictions can be made regarding potential parts needed or major problem experienced in the field at a vehicle's estimated mileage or age, such as at 6000 miles or 3 years.

Original data compiled for warranty analysis 150 may originate with customer feedback received by a single or multiple dealers within a dealer network, which is then sent to an automotive distributor (e.g., Toyota). The original data then returns to the warranty or service division of the company. (e.g., Toyota Motor Corporation) where analyses are performed to better predict and forecast problems. Generally, warranty data may be related to any original data associated with identifying a root cause 152 of a vehicular problem or prediction of a warranty claim, i.e., forecast early warning 154.

Specifically, a warranty claim report may consist of various types of information including temporal, numerical, categorical, and text data. Exemplary temporal data may include production dates, sales dates, repair dates, or the like while numerical data may include mileage, labor cost, part cost, or the like. Examples of categorical data may include, but are not limited to, model number or engine type. Further, text data may comprise consumer complaints, technician reasoning, action taken, or the like. Leveraging the knowledge from the unstructured data (e.g., text data) in conjunction with structured data may assist in warranty analysis to discover defects early in product life-cycle and identify root-causes of vehicular problems.

Continuing with FIG. 1, within logistics 160, product parts are maintained and arranged for shipping depending on the service requirements. Logistics 160 comprises various subsystems including product parts order 164 and product parts management 162. Product parts order 164 may manage the ordering of automotive parts while product parts management 162 is involved with the inventory of automotive parts. Logistics 160 may collectively deal with technology whereby automotive parts are ordered/preordered and managed to meet the requirements at a particular time. For example, if a new field issue requiring a part replacement is identified through field data processing 130, or through forecasting 154 from warranty analysis 150, product parts order 164 may implement the order of additional parts to avoid customer inconvenience.

The aforementioned building blocks of service are thus interconnected to provide integrated analysis from numerous data sources. Further, the building blocks of service may each have one or more associated objectives. For example, through data processing 130, product documentation 120 may be created. As another example, through field data processing 130, original data related to any vehicular problems may be received from a dealer network and analyzed. Further, each of the building blocks or subsystems mentioned previously may employ audit agents, in the form of software agents or human experts, to verify the individual processes and connections with other systems or subsystems. Generally, from the adaptive service system 100, feedback to design 110 reports and quality and customer-satisfaction analysis 140 may be generated. Specifically, after identifying root-cause indicators and countermeasures, feedback to design 110 reports may be generated and verified for implementation in a future product.

Generally, the adaptive service system 100 may serve numerous goals including, but not limited to, providing indicators of vehicle and/or subsystem quality improvement, providing early detection or prediction of vehicle and/or subsystem problems including root-cause identification, providing increased customer satisfaction and cost reduction. Information regarding faulty parts or inadequate service may be compiled, analyzed, and addressed to result in a reduction of cost for customers. Also, root-cause identification, or finding what is causing a particular problem, may result in a finding of a design problem, manufacturing problem, driving condition, road condition, or the like. In the event of a design or manufacturing problems, measures may be taken to result in cost reduction for both manufacturers and customers. The adaptive service system 100 collectively integrates heterogeneous original data from various sources and analyzes the original data for multiple applications related to service, such as warranty, diagnostics, for example, on a large-scale basis.

Figure 2:
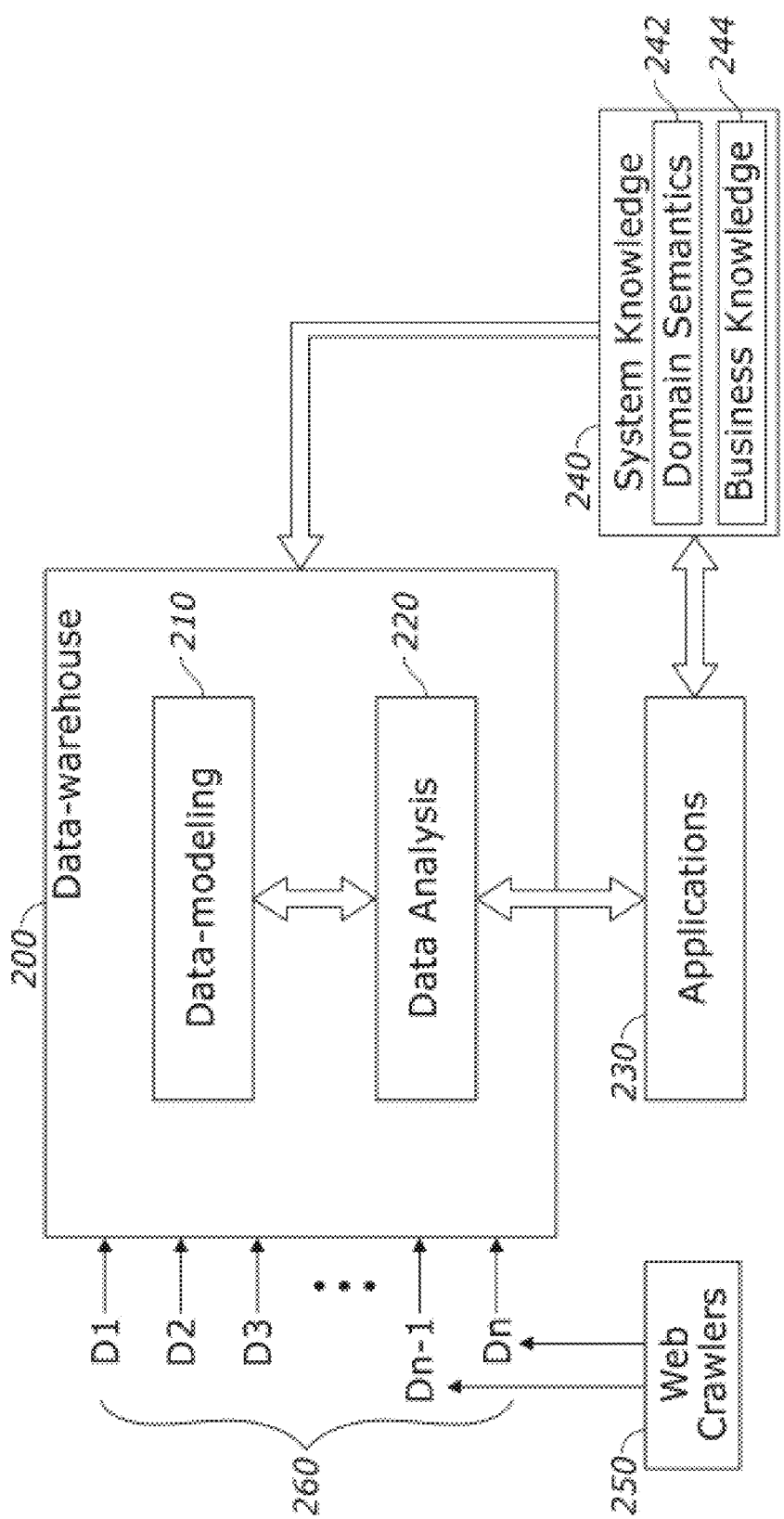
FIG. 2 illustrates a data warehouse for use with the adaptive service system in FIG. 1.

Moving to FIG. 2, a data warehouse, indicated generally at 200, is shown schematically to implement the adaptive service system 100 shown in FIG. 1. Generally, a data warehouse may be one implementation of a data-mining technique utilized such as in trending and case data analysis. The original data 260 may be created or retrieved by various sources such as direct customer feedback regarding automobiles, automotive parts, or automotive services (e.g., repair services) provided to a dealer or through the use of web crawlers 250 or field data collected through dealer networks or through remote services. Web crawlers 250 may comprise a software application which browses a wide-area network (WAN), such as the Internet, to extract information related to products (e.g., automotive) or diagnostic services (e.g., repairs). Various sources such as consumer blogs, automobile websites, forums, discussion boards, search engines, or the like, may provide part of the original data 260 to be retrieved by web crawlers 250. For example, web crawlers 250 may extract data 260 such as discussion among consumers related to the release of new vehicles, discussion related to vehicle problems/repairs encountered by self-technicians, or geographic information (e.g., location, weather, region) pertaining to vehicle problems.

In the example of product documentation 120, as shown in FIG. 1, original data 260 is received by a data warehouse 200 from an internal department within a company using a method such as domain semantics, for example. Original data 260 may comprise various types of information including, but not limited to, engineering data or data relating to the manufacture of a vehicle (e.g., drawings, technical data, computer-aided design (CAD) data, data from original equipment manufacturers (OEMs)), surveys (e.g., internal surveys, JD Power), technical assistance data, call center or customer relations data, warranty data, government data (National Highway Traffic Safety Administration (NHTSA)), repair orders (i.e., dealer data), measurement data (sensor data, freeze frame data (FFD), diagnostic data), miscellaneous data (e.g., Microsoft (MS) Office, PDF, hand-written), web data (e.g., discussion forums, blogs, search results), technical documentation (e.g., repair manual service (RMS), field technical reports (FTR), service bulletins (SB), recall notifications (i.e., service campaigns), metadata (e.g., extensible markup language (XML), or the like.

Generally, the original data 260 may comprise any suitable internal documentation, to aftermarket and service data. For example, the previously mentioned freeze frame data (FFD) may refer to any parameter, such as vehicle speed, pressure sensor data, temperature, etc., that is saved by the vehicle computer (i.e., control unit) when a vehicle experiences a problem and a diagnostic trouble code (DTC) is generated. Such information may be collected through remote services or at the automobile dealerships, which may be used to isolate faults in vehicles. As another example, the aforementioned service bulletin (SB) may refer to any addendum to an existing, static repair manual or documentation. Any suitable structured, semi-structured, or unstructured data may be constituents of the original data 260.

Further, the original data 260 may be correlated with another factor, such as time, to generate a dynamic information database. Particular original data, including engineering data, product documentation, or miscellaneous data, may be generated and/or gathered at a relatively early point in time, such as during the manufacture of a vehicle. Other original data may be generated and/or gathered at a later point in time, such as during the aftermarket or service duration. Such latter data may include, but are not limited to, technical assistance data, call center or customer relations data, survey data, or warranty data or web data.

The data warehouse 200 may comprise a data-modeling 210 layer whereby original data 260 is utilized to dynamically create and/or write repair documentation for multiple vehicle types/models identifying the common types of repair procedure utilized for each vehicle type/models. Once the modeling is completed, data analysis 220 occurs utilizing a variety of techniques such as data mining, knowledge discovery, or similar techniques implemented in software. Knowledge discovery may generally refer to the process of identifying novel, potentially useful, and understandable patterns in original data. Further, an application 230 may receive the product of the data analysis 220 to make a particular prediction. In the case of the application 230 being warranty analysis 150, as seen in FIG. 1, the data analysis 220 may comprise a prediction algorithm to process the original data 260 from multiple sources to predict a warranty claim. By way of illustration only, incoming original data 260 from multiple dealers indicate parts are being replaced for various automobile components such as brakes, suspension systems, engines, or transmissions, each component associated with a part number. The original data 260 may be subjected to data analysis 220 to determine factors related to the claim(s) for replacement parts, whereby the factors include individual driver behavior, isolated weather conditions or road surface, or faulty automotive component parts. The data warehouse 200 may also use system knowledge 240, consisting of domain semantics 242 and business knowledge 244, along with original data 260, for bringing further domain driven adaptation in data analysis for applications.

Figure 4:
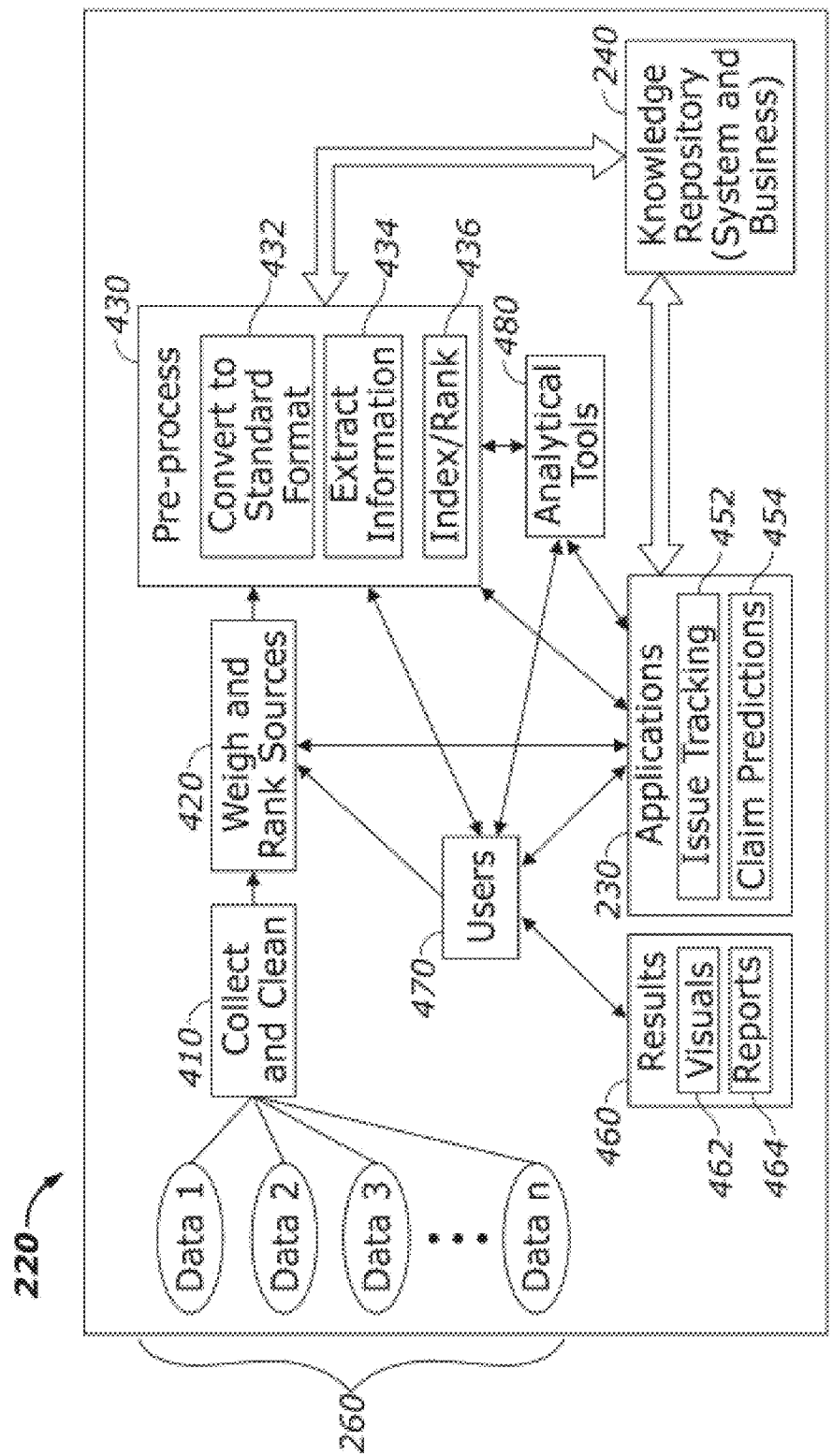
FIG. 4 provides a schematic for data analysis to implement the adaptive service system in FIG. 1.

Referring now to FIG. 4, a schematic is provided illustrating data analysis 220 to implement the adaptive service system 100 of FIG. 1, in one of its possible implementations. The original data 260 is collected and cleaned 410, such as by filtering, extraction, or connection of pertinent information. Any suitable type of information extraction or data-mining tool may be used to visualize original data to investigate vehicular problems and develop counter-measures to such problems.

Next, the data analysis 220 may involve weighing and ranking of sources 420. To this end, sources of the original data 260 are indexed and ranked. Field cases or the original data 260 may be ranked using statistical techniques and prioritized according to the criticality and alert methods indicated. Data sources may also be weighed and ranked depending on the application requirements. In an example of identifying critical problems, detailed field cases may receive a high rank. In yet another example, as for locating customer feedback, web data may be given a high rank. Generally, sources which provide more original data 260 for analysis may be given high priority for future analysis. Indexing may be based on factors such as system knowledge 240, location, weather conditions, emerging markets, criticality, or the like. During the process of ranking/indexing original data 260 or data sources, should new knowledge be acquired (e.g., new trends in customer feedback with respect to vehicle features, new fault phenomenon, previously un-noticed trends in original data), new objectives may be formulated. By way of example, if a new vehicle model is released using a component from a supplier which is also used by other vehicle manufacturers, a new objective of mining web data may be formulated to determine complaints from consumers.

The original data 260 may then go through additional pre-processing 430 involving various steps such as conversion, extraction, indexing, or the like. For example, the original data 260 may be converted to a standard format 432 from the original format (e.g., database, MS Office, MS Excel, MS Outlook) in which the original data 260 was received. The original data 260 collected may include unstructured data (i.e., natural language text) with errors such as misspellings or shortened format, for example. A language engine may be incorporated at an original equipment manufacturer (OEM) information processing system to read the natural language text and convert the original data 260 into structured data in standard format (e.g., with corrected spelling, restructuring of sentences, etc.) to be integrated with other remaining structured data. Any conventional standard format or format selected by a user 470 may be selected such as MS Excel, XML, semantic, or like.

Pre-processing 430 may also include the extraction of information 434 whereby users 470 can determine which format they prefer the original data 260 to be converted to and how the original data 260 is extracted. Pre-processing 430 may further include indexing/ranking 436 the original data 260 whereby the original data 260 itself is prioritized. Applications 230 or users 470 may also provide feedback to ranking systems such that if in some cases where certain features play a major role, the adaptive service system 100 can send a message to the ranking system to place priority on the particular features. Depending on application 230 or user 470 requirements, analytical tools 480 may then be utilized, such as data mining tools, to process the original data 260, i.e., determine root-cause indicators, predict claims, etc.

Similarly to FIG. 2, the data 260 may be processed by various applications 230 such as automated search, issue tracking, claim predictions, troubleshooting help, parts assessment or the like. The applications 230 may then implement issue tracking 452 or determine claim predictions 454 using the analytical tools 480 employed. As discussed previously, system knowledge 240, including business knowledge 244, may be utilized by applications in issue tracking 452 and claim predictions 454.

Continuing with FIG. 4, results 460 of the data analysis 220 may be exhibited in various formats including through visuals 462 and/or reports 464. Suitable forms of, visuals may be presentation slides, graphs, or the like, while conventional reports 464 such as MS Excel, MS PowerPoint, or other report formats may be contemplated.

Referring back to FIG. 2, an application 230 may further utilize system knowledge 240 to identify the root cause of the claim(s) for replacement parts, for example, to predict upcoming need for the replacement parts. Aspects of system knowledge 240 utilized may include domain semantics 242 and business knowledge 244. Collectively, the system knowledge 240 manages the three layers, i.e., data-modeling 210, data analysis 220, and applications 230. Collectively, semantic relationships (i.e., semantic web, semantic net) existing among system knowledge, the three layers, and original data may form integrated data, thus providing a common framework whereby original data is shared and reused across numerous applications, enterprises, and community boundaries.

Domain semantics 242 may generally refer to domain knowledge about how systems, sub-systems, or further units of the systems, are interconnected. For example, using a vehicle as a system, the power train and chassis network may comprise subsystems of the vehicle system. As to be discussed below, a domain taxonomy structure may present a vehicle, along with its interconnected subsystems, by name. Thus, in the present example, domain semantics 242 relates to knowledge of the power train and chassis network, and particularly, how they relate to one another or the vehicle system as a whole.

Business knowledge 244, as another aspect of system knowledge 240, may include news or information related to corporate events and/or decisions. Examples of business knowledge 244 may include, but are not limited to, a company's decision to cease manufacture of a product (e.g., vehicle) line, the establishment of a new manufacturing or assembly plant location, or the increase/reduction of sales of a particular product (e.g., vehicle) or subsystem at a particular location. Other examples of business knowledge may include positive/negative feedback from customers in response to features or subsystems of a particular product (e.g., vehicle) and information regarding the impact of weather conditions on particular vehicles or subsystems. By way of illustration only, in the event whereby business knowledge 244 may include information about the cease of production of vehicle "x", all original data regarding vehicle "x" may be removed from the system. Alternatively, in the same example, the original data related to subsystems (e.g., engines, transmissions) utilized in vehicle "x" maybe analyzed to determine whether they are used in other vehicle models and whether the vehicle models experience failure of the subsystems used in vehicle "x". Business knowledge may comprise information originally retrieved in natural language text to be converted to other formats, as discussed herein.

Figure 3A:
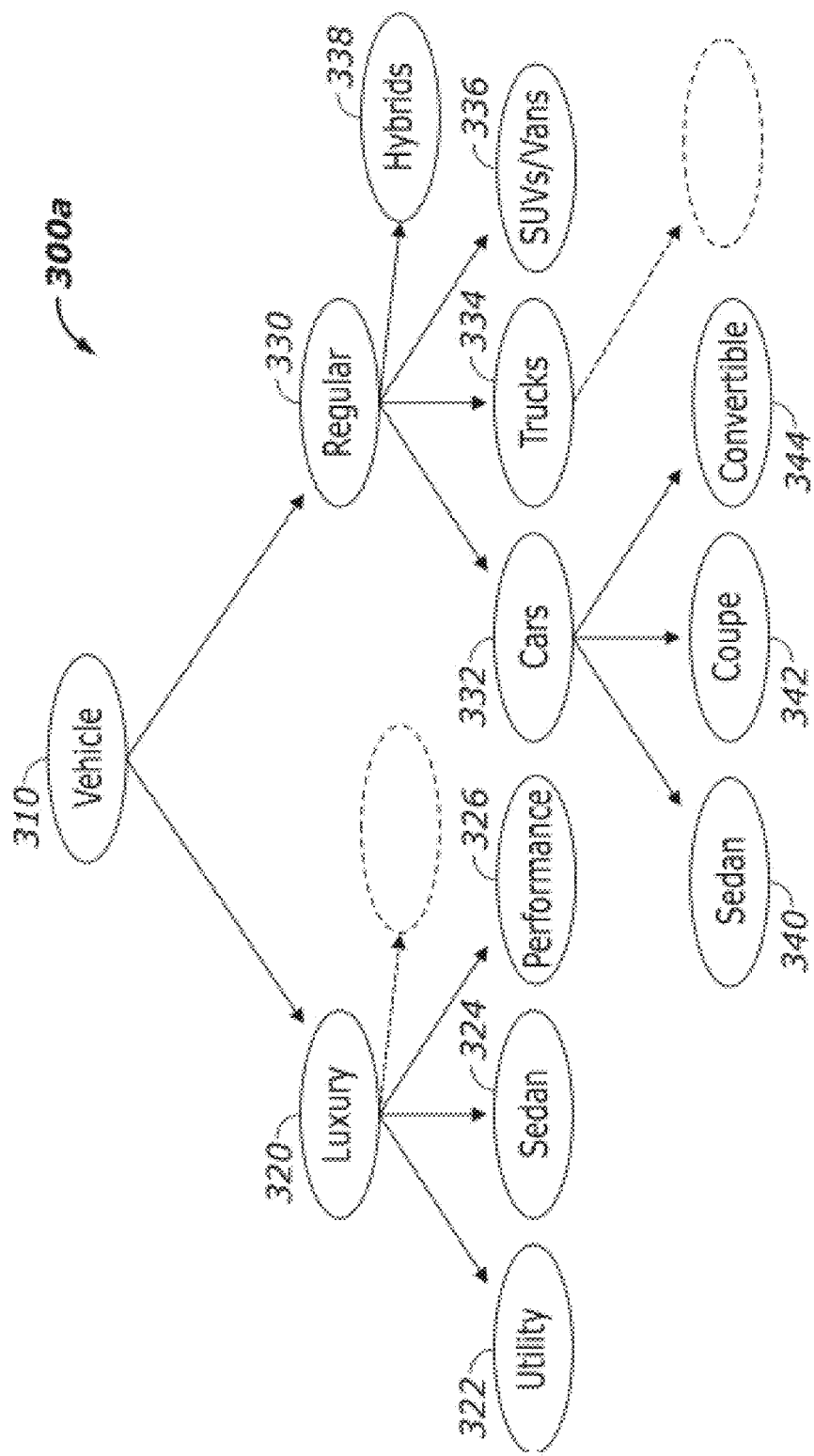
FIG. 3A illustrates a domain taxonomic structure for use with the adaptive service system in FIG. 1.

Turning now to FIG. 3A, a schematic is provided of an illustrative domain taxonomy structure, specifically, a vehicle-type domain taxonomy, indicated generally at 300a. The domain taxonomy structures shown herein may provide illustration of how domain semantics, previously discussed, relates various subsystems or sub-categories to one another. As shown for purposes of illustration only, the generalized category of a vehicle 310 may be divided into sub-categories of luxury 320 or regular 330 vehicles. Within the luxury 320 sub-category are various types including, but not limited to, utility vehicle 322, sedan 324, or performance vehicle 326. Alternatively, within the regular 330 sub-category of vehicles 310 are cars 332, trucks 334, sport-utility vehicles (SUVs)/vans 336, or hybrids 338. Cars 332 may be further divided into sedan 340, coupe 342, or convertible 344. It should be understood that applicable domain taxonomy structures may include other sub-categories not shown.

Figure 3B:
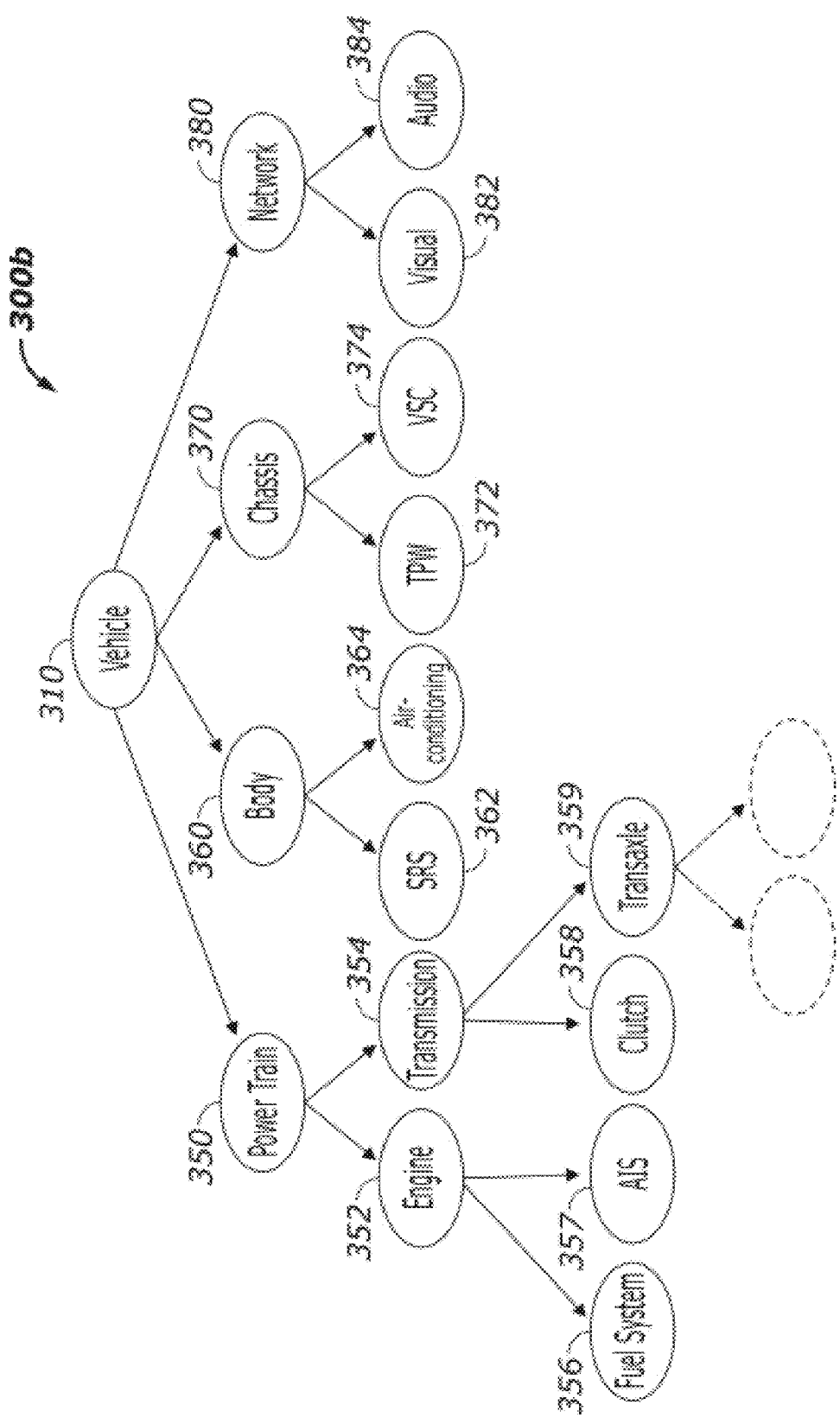
FIG. 3B illustrates a domain taxonomic structure for use with the adaptive service system in FIG. 1.

Referring now to FIG. 3B, a schematic is provided of another illustrative domain taxonomy structure, specifically, a vehicle component domain taxonomy, indicated generally at 300b. As shown for purposes of illustration only, the generalized category of a vehicle 310 may be divided into subsystems including power train 350, body 360, chassis 370 and network 380. Within the power train 350 subsystem are various other sub-subsystems including, but not limited to, engine 352 and transmission 354. Likewise, the body 360 may be divided into further sub-subsystems such as supplemental restraint system (SRS) 362 and air-conditioning 364, for example, as the chassis 370 may be divided into tire pressure warning (TPW) system 372 and vehicle stability control system (VSC) 374. The network 380 may further include a visual 382 and/or audio 384 component. The sub-subsystem engine 352 may be divided into the fuel system 356 and air intake system (AIS) 357 categories. The sub-subsystem transmission 354 may be divided into the clutch 358 and transaxle 359 categories. It should be understood that applicable domain taxonomy structures may include other sub-categories not shown.

Generally, domain taxonomy structures may be developed in the data warehouse 200 and stored in the system knowledge 240. The system knowledge 240 may then use semantic relationships to develop a hierarchical domain taxonomy utilizing graphical models. Using this approach, common concepts and/or relationships found in the system knowledge 240 may be shared by all product (e.g., vehicle) types, thus reducing redundancy in similar documentation for common products. Product documentation, as discussed previously, may be automatically compiled based on the application of a given vehicle using the system knowledge 240, thus reducing redundancy.

Figure 5:
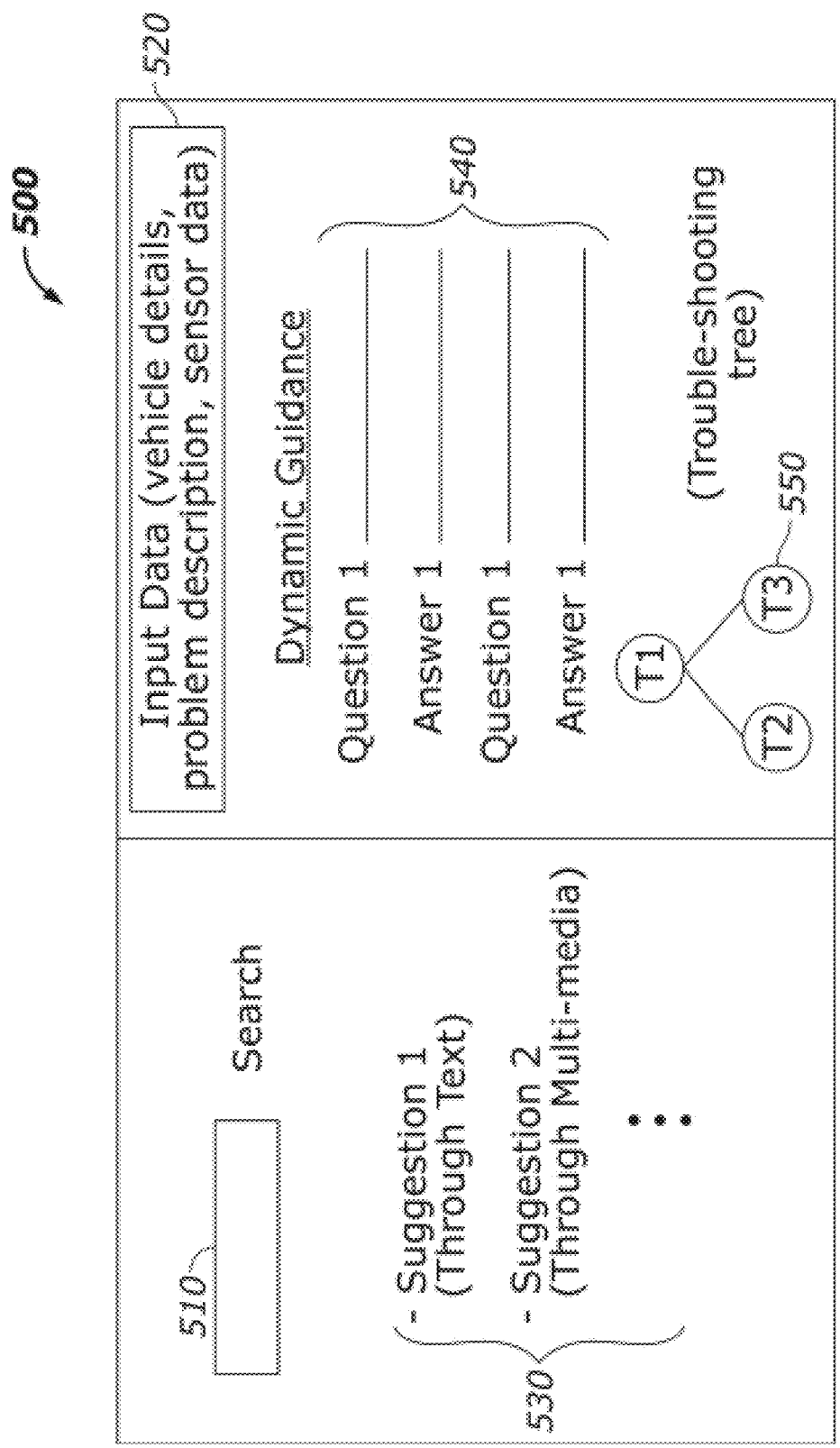
FIG. 5 illustrates a portal for receiving data into the adaptive service system in FIG. 1.

Turning now to FIG. 5, one possible implementation is provided of a portal 500 through which service repair data and/or repair documentation data is collected and retrieved to/from an information processing system. Service repair data collected by utilizing the portal 500 shown may assist technicians or service specialists in trouble-shooting problems with vehicles.

The portal 500 may include a search window 510 for a user (e.g., technician) to input an entry (e.g., keyword, code) that will be searched within the service repair data and/or repair documentation. The portal 500 may further include an input data window 520 to enable a user to input various information including, but not limited to, vehicle details (e.g., make, model, year) description of the vehicle problem, or sensor data, to provide detail to the search. For example, to diagnose brake failure found in a particular vehicle type, a technician may enter a keyword such as "brake" and input data 520 including the make and model of the vehicle to receive suggestions 530 on how to repair the brake failure.

In the event that the information processing system may not be able to provide an immediate repair suggestion upon entry of information into the search window 510 and/or input data window 520, the system may provide dynamic guidance 540 to trouble-shoot the problem. In one possible implementation, the dynamic guidance 540 may take the form of a series of questions provided by the information process system in response to the user's search and data entries as well as answers in response to dynamic guidance questions. A trouble-shooting tree 550 may then be generated by the system to assist a technician diagnose and repair a vehicle problem.

The present disclosure contemplates an information processing system, methods, and media for developing semantic relationships among data sources, original data, and knowledge base, thus enabling the sharing and utilization of data across numerous applications and business units. Development of semantic relationships further enables the dynamic updating of documentation, such as those pertaining to repair services, upon the receipt of incoming dynamic data. Systems, methods, and media disclosed herein thus provide improvements to the static nature of documentation related to goods and services, such as in the case of repair services documentation, whereby such documentation may be dynamically updated based the updating of data and data sources.

Computer implemented methods of the present disclosure may be carried out by any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a computer or information processing system discussed herein may be a personal computer, a server, a network storage device, or any other suitable device and may vary in size, shape, performance, functionality, and price. The computer or information processing system may include random access memory (RAM), one or more processing resources such as a central processing unit (CPU) or hardware or software control logic, ROM, and/or other types of nonvolatile memory. Additional components of the computer or information processing system may include one or more disk drives, one or more network ports for communicating with external devices as well as various input and output (I/O) devices, such as a keyboard, a mouse, and a video display. The computer or information processing system may also include one or more buses operable to transmit data communications between the various hardware components.

Furthermore, methods of the present disclosure, detailed description and claims may be presented in terms of logic, software or software implemented aspects typically encoded on a variety of storage media or medium including, but not limited to, computer-readable storage medium/media, machine-readable storage medium/media, program storage medium/media or computer program product. Such storage media, having computer-executable instructions, may be handled, read, sensed and/or interpreted by a computer or information processing system. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An adaptive information processing system for updating product documentation and an associated knowledge base specific to multiple automotive vehicular product lines, the system comprising:

an adaptive service system interactively and iteratively receiving original data from a data source, the data source including the following: a product documentation source, a field data processing source, a warranty analysis source and a logistics source and disseminating integrated data to the product documentation source, field data source, warranty analysis source and logistics source, the integrated data including the original data therein;

a processor associated with the adaptive service system configured to integrate the original data from the product documentation source, the field data processing source, the warranty analysis source and the logistics source without manual input, and to produce integrated data and update the associated knowledge base, wherein the integrated data is communicated to the product documentation source, the field data processing source, the logistics source and the warranty analysis source, wherein the original data is correlated to at least one time factor in a data warehouse resident in the processor; and wherein the integrated data communicated to the product documentation source is included in adaptive documentation and reporting, and the integrated data communicated to the field data processing source is included in automated search tools and in dynamic guidance for trouble-shooting, integrated data communicated to the logistic source is included in parts order information and parts management systems, and the integrated data communicated to the warranty analysis source is included in root-cause identification and early warning forecasts.

2. The adaptive information processing system of claim 1 wherein the data warehouse comprises a data modeling layer and a data analysis layer interactively relating to on another, wherein original data is employed in the data modeling layer to dynamically produce automated search tools, dynamic guidance for trouble shooting, parts order information, parts management systems, root cause identification and early warning forecasts and wherein data analysis occurring in the data analysis layer includes at least one of data source weighing and source ranking and data cleaning and collection.

3. The adaptive information processing system of claim 2 wherein data weighing and ranking includes user input and applications are used to effect weighing and source ranking, applications including at least one of the following: issue tracking and claim prediction and wherein data that has been weighed and source ranked can be subjected to at least one preprocess including at least one of the following: formatting, information extraction, indexing, ranking.

4. The adaptive information processing system of claim 3 wherein the preprocessed data can be dispatched to the knowledge base and the knowledge base is queried upon receipt of updated original data in the data warehouse.

5. The adaptive information processing of claim 3 wherein system knowledge is inputted into the data warehouse and wherein integrated data produced in the data warehouse by the interactively proceeds through application to update system knowledge.

6. The system of claim 1, wherein the product documentation and the associated knowledge base are related to automotive repair services, wherein the domain semantics include domain taxonomy structure regarding interconnected vehicular subsystems.

7. The system of claim 1, wherein the original data is associated with product parts management or product parts order.

8. A computer implemented method for dynamically updating product documentation and knowledge base associated with multiple automotive vehicular product lines, the method comprising the steps of:
   employing an adaptive information processing system for updating product documentation and an associated knowledge base specific to multiple automotive vehicular product lines, the system including:
      a) an adaptive service system interactively and iteratively receiving original data from a data source, the data source including the following: a product documentation source, a field data processing source, a warranty analysis source and a logistics source and disseminating integrated data to the product documentation source, field data source, warranty analysis source and logistics source, the integrated data including the original data therein; and
      b) a processor associated with the adaptive service system configured to integrate the original data from the product documentation source, the field data processing source, the warranty analysis source and the logistics source without manual input, and to produce integrated data and update the associated knowledge base, wherein the integrated data is communicated to the product documentation source, the field data processing source, the logistics source and the warranty analysis source, wherein the original data is correlated to at least one time factor in a data warehouse resident in the processor;
      c) wherein the integrated data communicated to the product documentation source is included in adaptive documentation and reporting, and the integrated data communicated to the field data processing source is included in automated search tools and in dynamic guidance for trouble-shooting, integrated data communicated to the logistic source is included in parts order information and parts management systems, and the integrated data communicated to the warranty analysis source is included in root-cause identification and early warning forecasts;
   receiving original data associated with multiple automotive vehicular product lines from the data the data source including: at least one product documentation source, at least one field data processing source, at least one warranty analysis source and at least one logistics source in a digital data warehouse;
   integrating, without manual input, the knowledge base with the original data received from the data sources to form integrated data, the integrating step occurring in the digital data warehouse, wherein the integrating step includes a data modeling step and a data analysis function, wherein the integration step is accomplished by the processor;
   mapping the integrated data with at least one application, the application external to the digital data warehouse in communication with system knowledge, wherein the system knowledge is governed by domain semantics and business knowledge; and
   dynamically updating the knowledge base and dynamically updating the product documentation and the knowledge base based on integrated data.

9. The computer implemented method of claim 8 wherein the dynamically updated product documentation and knowledge base integration step comprises weighing and ranking data inputs by source, the weighing and ranking step including user-initiated inputs and applications in communication with the digital data warehouse.

10. The computer implemented method of claim 9 wherein the data that has been weighed and ranked according to source is subjected to a preprocess in which the data is standardized and ranked indexed the preprocess governed by user-initiated inputs, analytical tools resident in the data warehouse and applications external to the digital data warehouse prior to dynamically updating the knowledge base and product documentation.

11. The computer implemented method of claim 8 wherein the digital data warehouse resides in an adaptive service system configured to disseminate integrated data to the following data sources: the at least one product documentation source, the at least one field data processing source, the at least one warranty analysis source and the at least one logistics source in a digital data warehouse, wherein the product documentation including integrated data produces adaptive documentation and reporting, and wherein the field data processing source produces dynamic guidance for trouble-shooting and automated search, and wherein the logistics source disseminated parts orders and parts management and wherein the warranty analysis source produces early warning forecasts and root cause identification.

12. The computer implemented method of claim 8 wherein the original data is shared and reused across applications and community boundaries.

13. The computer implemented method of claim 8 wherein at least a portion of the original data is derived from data mined from at least one of the following: blogs, discussion boards, on-line forums, field data, regulatory agencies, customer feedback regarding automobiles, customer feedback regarding automotive parts, customer feedback regarding automotive services, wherein the original data comprises data related to identifying a root cause of a vehicular problem or prediction of a warranty claim.

14. The computer implemented method of claim 9 wherein, collectively, system knowledge manages data modeling, domain semantics, and application and semantic relationships existing among system knowledge, data modeling, domain semantics and application and original data to form the integrated data.

15. The method of claim 12 wherein the data source comprises field data in association with data mined from at least one of the following; data associated with regulatory agencies, customer feedback regarding automobiles, customer feedback regarding automotive parts, customer feedback regarding automotive services.

16. The method of claim 11, wherein the product documentation is associated with automotive repair services.

17. The method of claim 16, wherein the original data is associated with parts management or parts order.

18. The method of claim 8, wherein integrating the knowledge base with the original data comprises:
   establishing a semantic relationship among the knowledge base and the original data; and
   dynamically updating the product documentation based on the semantic relationship.

19. The method of claim 18, further comprising:
   utilizing web crawlers to extract data associated with products or diagnostic services; and
   dynamically updating the product documentation and the knowledge base based on the data extracted.

20. The method of claim 8, wherein the original data comprises warranty data related to identifying a root cause of a vehicular problem or prediction of a warranty claim.

21. The method of claim 8, wherein the original data is associated with parts management or parts order.

\* \* \* \* \*